United States Patent [19]
Dal Tio

[11] Patent Number: 5,896,806
[45] Date of Patent: Apr. 27, 1999

[54] MACHINE FOR PREPARING COFFEE, WHITE COFFEE OR SIMILAR INFUSED BEVERAGES, ON SINGLE OR MULTIPLE DOSES THEREOF

[75] Inventor: Nello Dal Tio, Susegana, Italy

[73] Assignee: C.M.A. S.p.A., Susegana, Italy

[21] Appl. No.: 08/875,152

[22] PCT Filed: Oct. 31, 1996

[86] PCT No.: PCT/EP96/04737

§ 371 Date: Jun. 25, 1997

§ 102(e) Date: Jun. 25, 1997

[87] PCT Pub. No.: WO97/17006

PCT Pub. Date: May 15, 1997

[30] Foreign Application Priority Data

Nov. 6, 1995 [IT] Italy .................................. PN95A0056

[51] Int. Cl.[6] .............................. A47J 31/52; A47J 31/40
[52] U.S. Cl. .............................. 99/289 T; 99/290; 99/293
[58] Field of Search .............................. 99/289 T, 289 R, 99/290, 293, 295

[56] References Cited

U.S. PATENT DOCUMENTS

| | | |
|---|---|---|
| 2,935,010 | 5/1960 | Arnett et al. . |
| 3,143,954 | 8/1964 | Nesmith ................................. 99/289 T |
| 3,353,474 | 11/1967 | Mac Corkell . |
| 4,353,293 | 10/1982 | Illy ........................................ 99/289 T |
| 5,353,692 | 10/1994 | Reese et al. ......................... 99/289 T |
| 5,520,093 | 5/1996 | Ackermann .......................... 99/289 T |

FOREIGN PATENT DOCUMENTS

| | | |
|---|---|---|
| 0093366 | 11/1983 | European Pat. Off. . |
| 0117118 | 8/1984 | European Pat. Off. . |
| WO 95/11613 | 5/1995 | WIPO . |

*Primary Examiner*—Reginald L. Alexander
*Attorney, Agent, or Firm*—Bucknam and Archer

[57] ABSTRACT

A machine for preparing coffee, white coffee or similar infused beverages, on single or multiple doses thereof, utilizes waffles (40) packed in advance, applied in a continuous band (41), in a number sufficient to prepare various coffees or other infused beverages. The machine has guide and feeding device (43) associated to the infusion units (35), (36) and the filters (97), (98) thereof, to determine the advancement of the band (41) through the infusion units (35), (36), by stopping each waffle in correspondence thereto for performing the related infusion operation. The machine may contain also a mixer-emulsifier (52) with conduits (105) communicating or not communicating with the infusion units (35), (36) through a switching valve member (106), for preparing the white coffee or other infused beverages mixed with milk.

10 Claims, 15 Drawing Sheets

FIG. 3c)
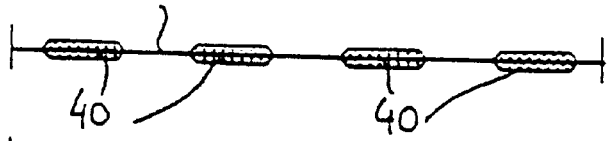
FIG. 4
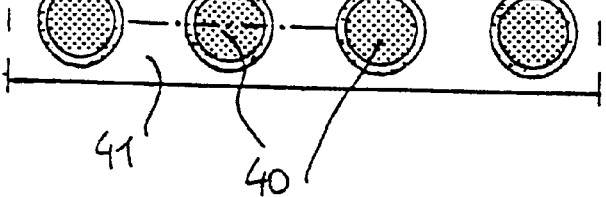
FIG. 5
FIG. 3b)
FIG. 3 a)

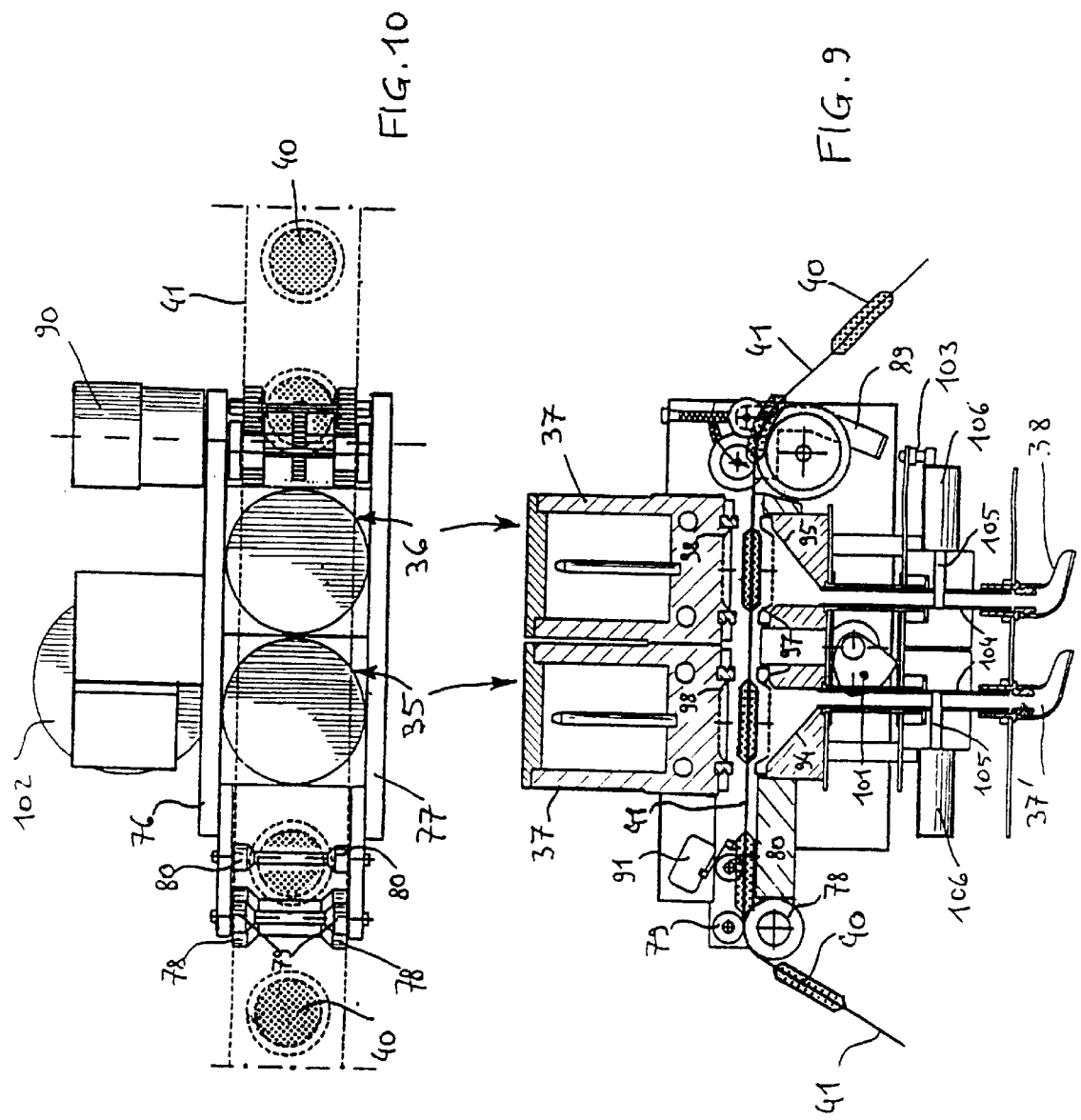

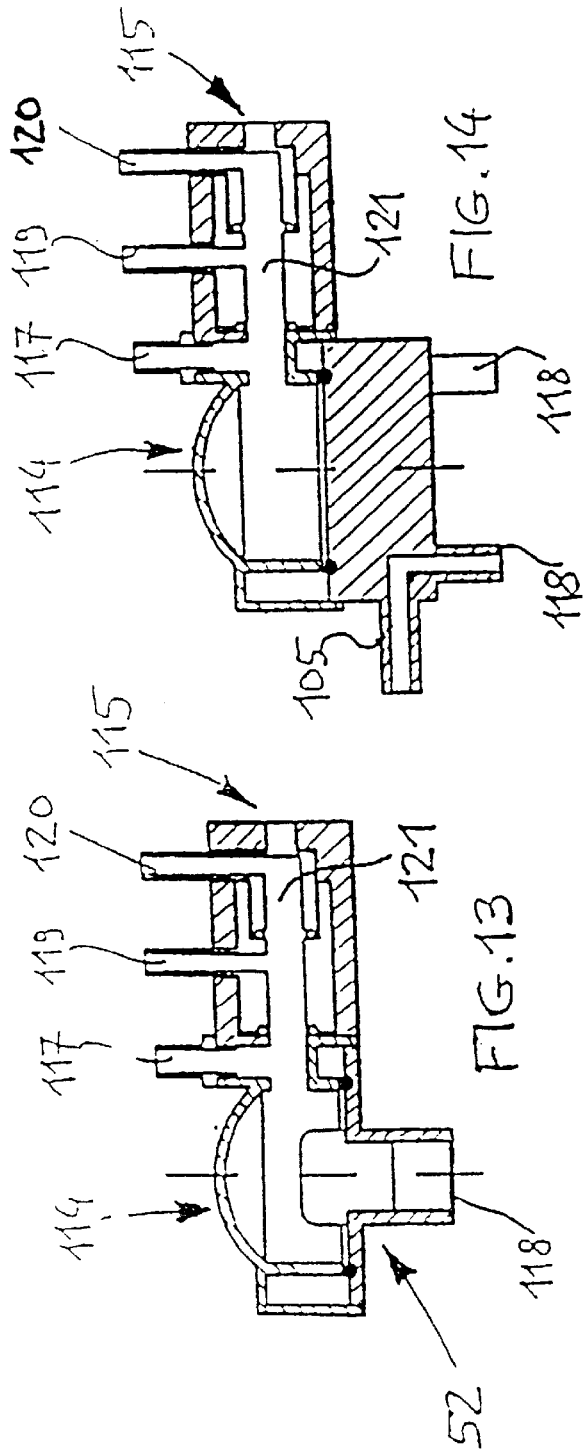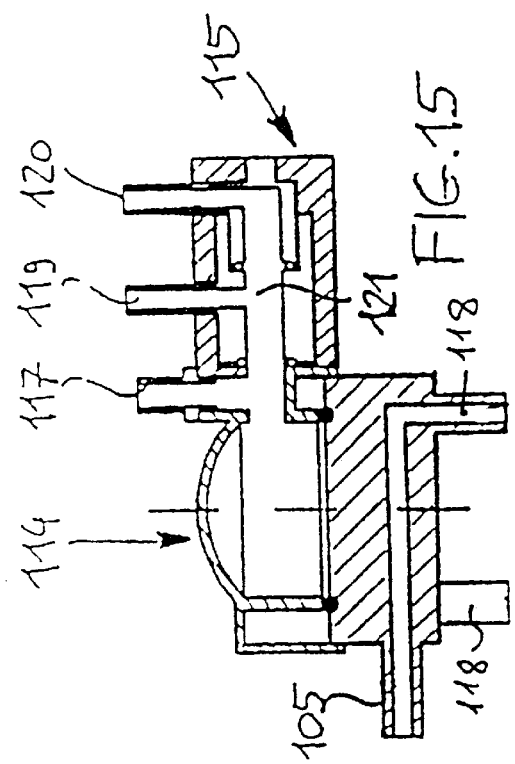

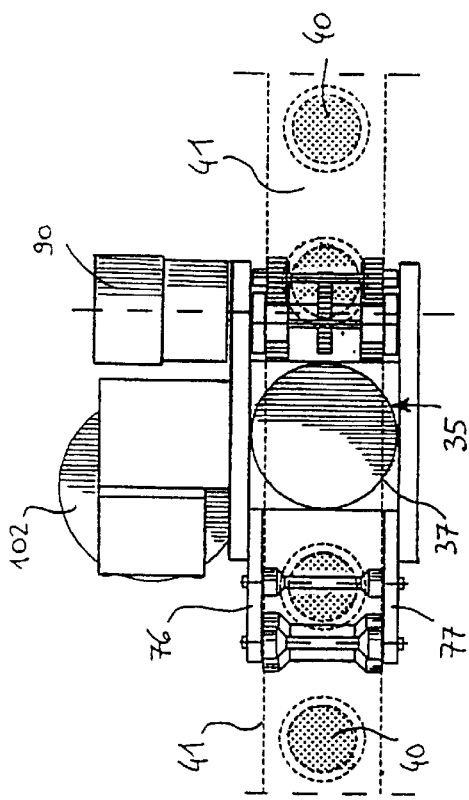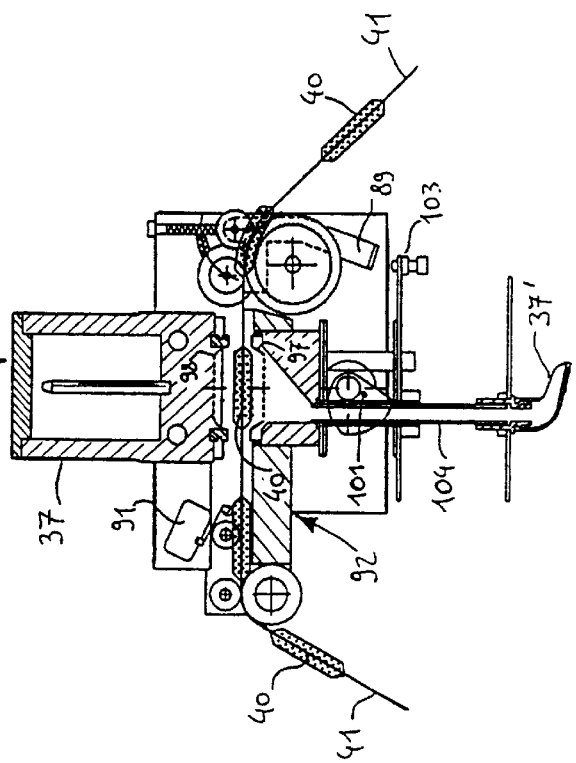

MACHINE FOR PREPARING COFFEE, WHITE COFFEE OR SIMILAR INFUSED BEVERAGES, ON SINGLE OR MULTIPLE DOSES THEREOF

FIELD OF THE INVENTION

The invention relates to a machine for preparing coffee, white coffee or similar infused beverages, which are distributed on single or multiple doses thereof, wherein the coffee or the different raw materials for preparing the respective infused beverages are introduced into waffles packed in advance.

BACKGROUND OF THE PRIOR ART

At the present time, there are known machines of different kind for preparing coffee, white coffee or similar infused beverages, comprising substantially one or more infusion units housed into a box-like housing and provided with a respective boiler for containing water, which is suitably heated by means of electric heating elements connected in the machine electric circuit, and one or more filters in which the ground coffee (or other raw material for the infusion) is introduced in advance, which filters are arranged on a position below the relative infusion units for permitting the heated water coming from the related boiler to pass therethough, thus preparing the coffee or other infused beverages.

Moreover, in the case in which such machines are arranged for preparing white coffee too, they also include one or more mixer-emulsifier units of per se known type, communicating with at least a milk containing receptacle housed into said machine box-like housing, on a position above the corresponding mixer-emulsifier unit. Then, in this case the milk is heated in advance in the machine and introduced on metered amounts thereof in the corresponding mixer-emulsifier, where it emulsifies itself with air at a pre-established ratio, thereby forming milk foam, which is subsequently introduced in the receptacle containing the coffee or other infused beverage which has been prepared in advance in the machine, by mixing with it therewith. These kinds of machines therefore permit to obtain coffee, white coffee or similar infused beverages with different operations, in which first of all are needed the 1) preparation of the ground coffee (or of the different raw materials for the other infused beverages), 2) the introduction in the corresponding filter thereof, which filter has been detached from the machine in advance, and subsequently coupled in the same machine, and finally 3) the introduction of the associated infusion unit for preparing the desired infused beverage, with the need to provide another mixing with the milk foam thereof, in case in which infused beverages mixed with milk have to be prepared.

Moreover, there is the need to clean the different filters after a prolonged operation period thereof, for being re-used in subsequent operations of the same kind and this makes complicated and less practical in use the operation and maintenance of these machines and permits the use thereof exclusively as machines for a bar, wherein they are able to prepare infused beverages generally in a limited and discontinuous frequency, and therefore do not lend themselves evidently for a use in which a continuous preparation of numerous infused beverages is required such as for example in community refectories and the like.

SUMMARY OF THE INVENTION

The present invention has the object to overcome the drawbacks and limitations of the above mentioned machines, by means of the use of an automatic operating machine for preparing coffees white coffee or similar infused beverages, adapted to prepare in a continuous manner both limited and high quantities of such infused beverages with a reduced number of operations thereof. This machine is made with the substantially described characteristics thereof, with particular reference to the attached patent claims.

BRIEF DESCRIPTION OF THE DRAWINGS

The invention will be understood better from the following description given solely by way of not-limiting examples and with reference to the accompanying drawings, wherein:

FIG. 3a shows a perspective front view of a band with the waffles prepared with the respective raw materials for the infusion, which band is stacked on yourself;

FIG. 3b shows with the same view of FIG. 3a a waffle of the band of this Figure, cutaway in a longitudinal direction along the line A—A;

FIG. 3c shows a front view of FIG. 3b;

FIGS. 4 and 5 show respectively a front and a plan view of the waffle band represented in the FIG. 3a;

FIG. 9 shows with the same view of FIG. 6 the constructive item displaced in the same operative position thereof and incorporating the waffle band;

FIG. 10 shows a plan view of the constructive item of FIG. 9;

FIG. 13 shows schematically a cutaway front view of a further constructive item of the present machine, in a first embodiment thereof;

FIGS. 14 and 15 show schematically a cutaway front view of two different embodiments of the constructive item of FIG. 13;

FIG. 23 shows a cutaway front view of a constructive item of the machine of FIGS. 21 and 22, displaced in a first operative position thereof;

FIG. 24 shows a plan view of the constructive item of FIG. 23;

In the indicated Figures, there is represented schematically a machine according to the invention for preparing coffees white coffee or similar beverages, on single or multiple doses thereof, which operates fully automatically in a way to prepare in a continuous manner both limited and high quantities of such infused beverages, thereby allowing them to be employed respectively in bars and rooms where a distribution of such beverages with a limited and discontinuous frequency is needed and on refectories, rooms etc. where a continuous distribution of numerous infused beverages is needed.

Figure 1:
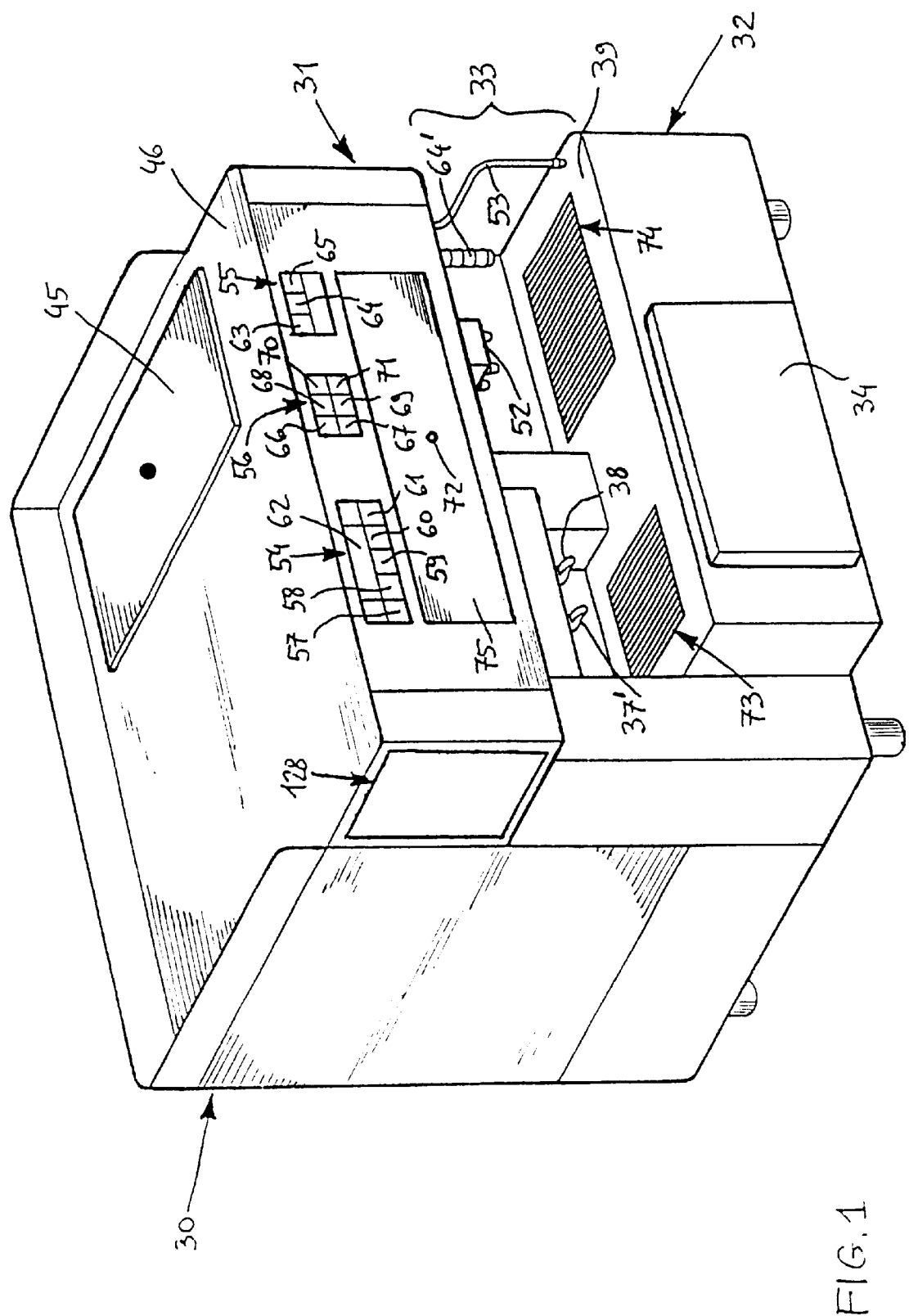
FIG. 1 shows schematically a perspective front view of a of a machine in accordance to the invention, in a first embodiment thereof.
Figure 2:
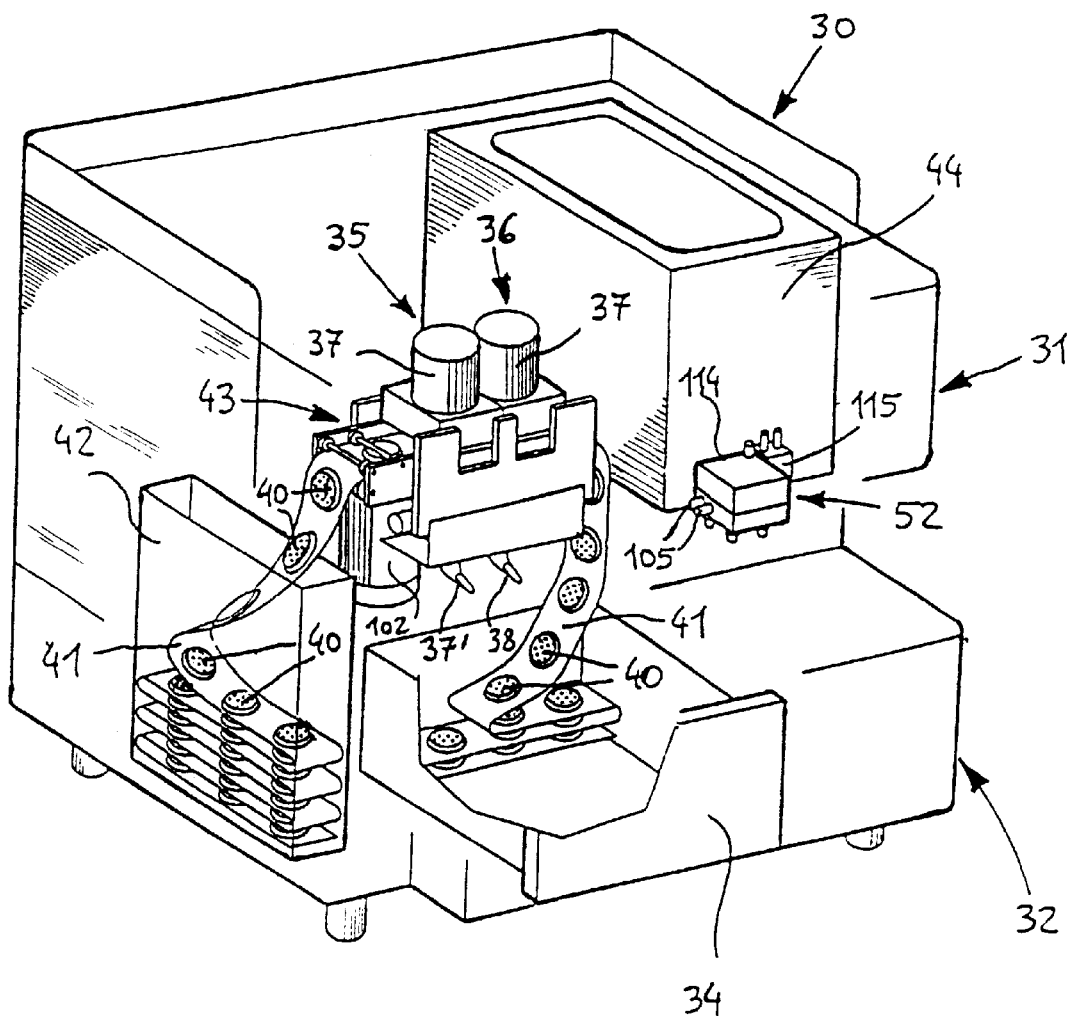
FIG. 2 shows with the same view of the machine of FIG. 1, partially cutaway in a manner to see the inner component parts thereof.
Figure 7:
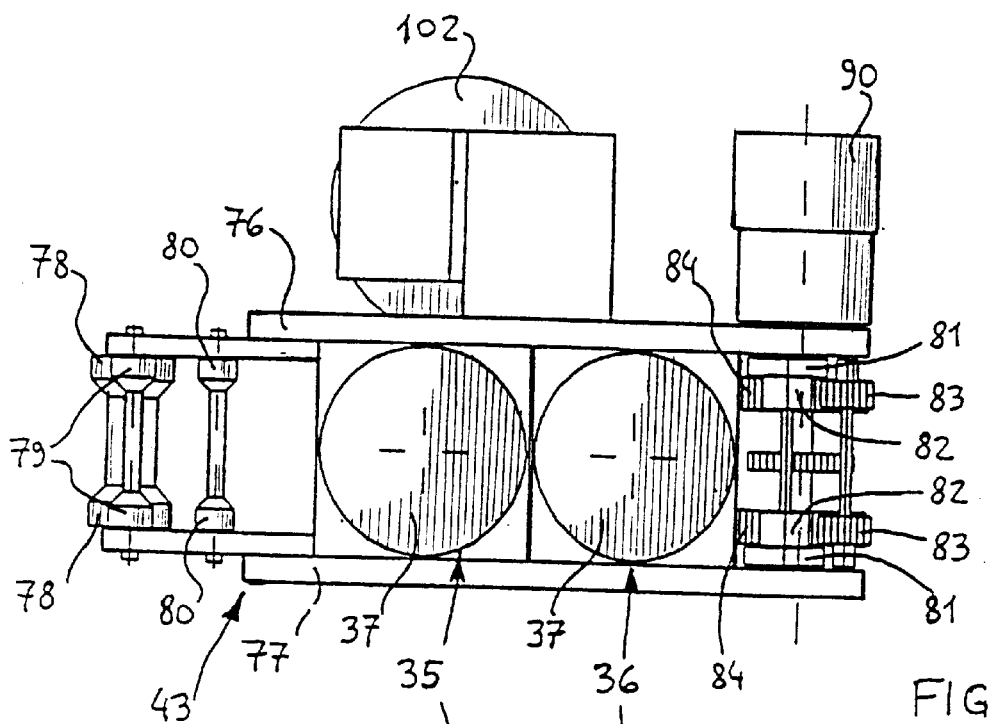
FIG. 7 shows a plan view of the constructive item of FIG. 6.

With particular reference to FIGS. 1 and 2, a first embodiment of this machine is shown which is arranged for preparing and distributing coffees white coffee and other infused beverages both on a single dose for a person only and on double or multiple doses for two or more persons.

For this purpose the machine refered to is substantially constituted by a box-like housing 30 adequately dimensioned and shaped in a manner to form an upper portion 31 containing the different component parts of the machine, which will be described in detail hereinbelow and a lower portion 32 moved away from the precedent portion so as to form an interspace 33 with suitable volume, in which portion at least a slidable drawer 34 is housed, which is provided for receiving and removing the substances discharged from the machine after the preparation of the related infused beverages. The upper portion 31 and the lower portion 32 are joined to each other with all the remaining machine structures. The machine upper portion 31 is structured for housing the component parts for preparing both the coffee or other infused beverages and the milk, which is mixed with the coffee thereby forming the white coffee, or it is mixed also to the other infused beverages. For convenience, in the present machine there will be described only the machine parts for preparing coffee and white coffee, but of course also other infused beverages, mixed or not mixed with milk, may be prepared with the same criteria.

For this purpose, the upper portion 31 is provided internally with at least two infusion units 35 and 36 of per se known type, housed on the left side thereof side-by-side to each other, and each comprising a respective boiler 37 for containing and heating water, which boiler is adequately connected to the water supply or any other separate water receptacle (not shown), through conduits and flow regulating members such as solenoid valves or the like (not shown), and associated with electric heating resistances (also not shown), provided for heating water and connected in the machine electric circuit with all the remaining control and regulating members thereof which are also housed into the upper portion 31.

The object of the infusion units 35 and 36 is to prepare the coffee (or the other different infused beverages) by means of passage of hot water, which has been prepared and collected in the boilers of the same unit, through adequate waffles packed in advance with the respective needed raw materials, which waffles are moved from time to time corresponding to the infusion units, with subsequent passage of the coffee or other so obtained infused beverages through a corresponding delivery spout 37' and 38 of conventional type, situated below the infusion units and the associated waffles, from which such beverage finally arrives on an underlying glass or similar receptacle, which is disposed below each spout by laying it onto the horizontal supporting plane surface 39 constituting the upper closing surface of the machine lower portion 32.

By referring now to the FIGS. 2,3, 4 and 5, there are shown the employed packed waffles, marked with the reference numeral 40, which are identical to each other and suitably shaped, with the doubly flared cylindrical form represented in the Figures referred to or also with different forms, and which are applied at a central position and at identical and pre-established spacings along a continuous band 41 formed by two strips of paper for foods or other suitable hygienic material, which is permeable to liquids and of limited width, joined together in a longitudinal direction thereof, in such a way that each waffle is included between such strips, and projected at the same extent from both surfaces of the same band.

Each waffle band 41 is made with an adequate length and such as to permit to prepare various coffees (or other infused beverages) and is introduced in advance, by stacking and folding it on yourself, on a corresponding collecting magazine 42 extending vertically which is placed appropriately inside the present machine, at the left side thereof on a position side-by-side to the infusion units 35 and 36, from which a band is then extracted and advanced as it will be described through a guide and feeding mechanism 43 associated with the infusion units 35 and 36 and made as described hereinbelow in a manner that the preparation of the infused beverages is determined on this zone by contact with the raw material contained into each waffle 41, said band with the exhausted waffles arriving finally from the guide and feeding mechanism 43 into the underlying slidable drawer 34, for being subsequently extracted at the end of all the provided infusion operations.

Figure 12:
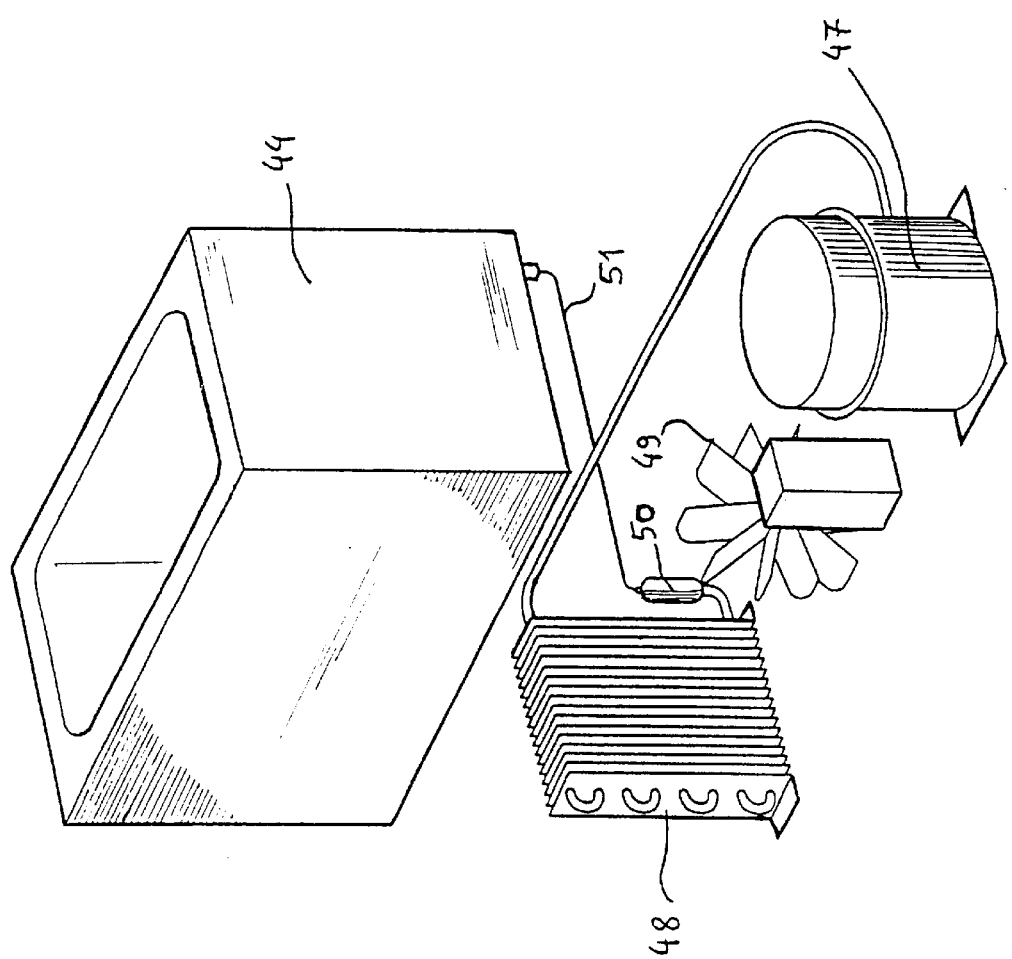
FIG. 12 shows schematically a front perspective view of another constructive item of the machine according to the invention.

The machine upper portion 31 is also provided with a box-like tank 44 for containing milk, housed on a corresponding inner cavity of the same machine and accessible through an overturning closing lid 45, hinged to the uppper wall 46 of the machine. The tank 44 is associated preferably with a compression refrigerating system of conventional type, shown in the FIG. 12 which shows the compressor 47, the finned refrigerating battery 48 acting as condenser, which in turn is cooled by an adequate fan 49, the desiccator 50, the capillary tube 51, while the evporator of this system, not shown in the Figure, is wound around the same tank, so as to cool it at a temperature sufficient to preserve the milk, which is contained in the correspondent vessels which are disposed into said tank.

In turn, the tank 44 communicates through suitable conduits (not indicated) with at least an underlying mixer-emulsifier 52, which in turn communicates with the infusion units 35 and 36 on the positions which will be described hereinbelow in order to draw metered quantities of milk from each vessel housed in the tank 44 and convey them through the mixer-emulsifier 52, so as to prepare the white coffee or other infused beverages mixed with milk as it will be described hereinbelow and finally to distribute them into an underlying glass or similar container, which is disposed below said mixer-emulsifier by supporting it on the machine horizontal plane surface 39.

Finally, the machine upper portion 31 is provided with at least a conduit 53 for the passage of hot steam, joined to the steam generator which is also provided inside the machine, in order to heat at will the different distributed beverages. For selecting the different operative programs to be performed, the present machine is provided with selection devices and indicators of electronic types included in different separate control panelboards 54,55 and 56 applied in the front part of the machine upper portion 31 and associated to adequate control logic circuits (not shown) and to the different machine component parts so as to select and display from time to time the respectively needed operative programs, which are performed under the control through the circuits, as it will be described.

In particular, the control panelboard 54 is constituted by the set of selector push-buttons 57, 58 59, 60 and 61 with the associated L.E.D. or similar luminous indicators, which indicate the respective on or off position thereof by turning on or off the light, and by a display 62 (formed by a 2-lines LCD with 16 characters) for indicating the operative parameters and programs which are respectively selected through the push-buttons, as well as any possible alarm system provided in the machine for controlling the correct operation of the different component parts.

The push-button 57 serves for the selection of a single coffee dose, for a single person only (an espresso coffee), or the other infused beverages, which are distributed through the spout 37'. The push-button 58 serves for the selection of a respective single coffee dose, for two different persons (two espresso coffees), or the other infused beverages, which are distributed through the spouts 37' and 38. The coffee doses for one or two persons may be adjusted at will by action on the same push-buttons as described, up to a maximal amount recommended by the manufacturer or distributor for maintaining an agreeable coffee taste. In turn, the push-button 59 serves for the selection of a coffee dose, however with the addition of a metered quantity of hot water (a weak espresso coffee), for a single person, or the other infused beverages, which are distributed through the spout 37'. The push-button 60 serves for the selection of a respective coffee dose, however with the addition of a metered quantity of hot water (two weak espresso coffees) for two persons, or the other infused beverages, which are distributed through the spouts 37' and 38. The push-button 61 serves to stop the machine operation (stop position) and to set the different parameters of each operative program which can be performed in the machine, by displaying them on the display 62, together with any possible provided alarm system, as well as the different machine operative programs which will be described hereinbelow and which are also displayed on the display 62, which programs are stored in advance in the software system of the associated control logic circuits made as integrated circuits, included on one or more electronic cards connected electrically to the panelboard 54 and the remaining panelboards 55 and 56.

In turn, the control panelboard 55 is constituted by the set of selector push-buttons 63, 64 and 65 with L.E.D or similar luminous indicators associated therewith, which indicate the light of the respective positions on or off. The push-buttons 63 and 64 serve to regulate the hot water supply duration, respectively for preparing the infused beverages in the manner which will be described hereinbelow and for different uses, the water passing through a further conduit 64'. The push-button 65 serves for time controlling the steam distribution, by passing it through the conduit 53.

Finally, also the remaining control panelboard 56 is constituted by a set of selector push-buttons 66, 67, 68, 69, 70 and 71 with L.E.D. or similar luminous indicators associated therewith, which indicate the respective on or off position thereof by turning on or off the light, which position is also displayed on the display 62, said push-buttons being provided for regulating the distribution of milk coming from the associated vessel housed in the tank 44. In particular, the push-button 66 serves for the selection of a single dose of white coffee, for a single person (one white coffee), or milk mixed with other infused beverages which is distributed through the mixer-emulsifier 52. The push-button 67 serves for the selection of a respective single dose of white coffee, for two different persons (double white coffee), or milk mixed with other infused beverages which is always distributed through the mixer-emulsifier 52. As hereinabove also in this case each dose of coffee (or other infused beverage) to be distributed in the same manner and for the same purpose as described above can be changed. The push-button 68 serves for the selection of a pre-established and variable milk dose, for a single person, (a single does of normal milk), which is distributed through the mixer-emulsifier 52.

The push-button 69 serves for the selection of a respective pre-established and variable milk dose, for two different persons (a double dose of normal milk), which is always distributed through the mixer-emulsifier 52.

The push-button 70 serves for the selection of a pre-established and variable dose of emulsified milk, for a single person, thereby forming milk foam, which is distributed through the mixer-emulsifier 52. Finally, the remaining push-button 71 serves to stop the machine operation (stop position) and to perform the same functions of the preceding push-button 61 of the control panelboard 54.

Turning now to FIG. 1 again, the present machine is provided additionally with two flat grates 73 and 74, applied onto corresponding through openings (not indicated) provided through the supporting plane surface 39, below respectively the delivery spouts 37' and 38, the mixer-emulsifier 52, the steam conduit 53 and the water conduit 64', in order to collect the liquids and wastes passing therethrough and to convey them on a tray (not indicated), included in the machine lower portion 32 and communicating with such through openings, for the subsequent elimination of these liquids and wastes.

Finally, the present machine is constituted by an overturning lid 75, applied on the upper portion 31 thereof, and extended below the control panelboards 54, 55 and 56. The lid has an opening and through an associated key 72 actuates a safety microswitch (not shown), connected in the machine electric circuit, which in turn provides for switching off the electric supply of the whole machine, through an associated and remote control switch (not shown too), thereby permitting the needed intervention on the different electric component parts of the same machine to be performed.

Turning now, particularly to the FIGS. 2 and 6–11, there are described the machine guide and feeding mechanism 43, as well as the main component parts thereof and their operation mode. In particular, the guide and feeding mechanism 43 substantially comprises two flat and metallic rectilinear guide members 76 and 77 parallel and spaced away to each other, fixed in the machine at a position below the infusion units 35 and 36, supporting at their inlet end portion (at the lef side) a set of idle rollers 78, 79 and 80 and at their outlet end portion (at the right side) a set of powered rollers 81, 82, 83, 84 and 85, associated with a spring system 86 and a bracket 87 provided with two shanks 88 and 89 fixed to the oposite guide member. Shank 89 projects vertically downward beyond the same powered rollers, for the reasons which will be described. In particular, these powered rollers are driven by an associated electric motor 90 fixed laterally to such guide members 76 and 77, through suitable speed changing gear members (not shown) associated to such motors in order to provide for advancing the waffle band 41 through the entire mechanism referred to, in the direction A, from the inlet end portion in which it is introduced with the waffles ready for the infusion operation, to the outlet end portion thereof in which such band with the exhausted waffles after the infusion operation is entrained by said powered rollers into the underlying machine slidable drawer 34.

A sensor for sensing the presence of the waffle band 41 made advantageously as a microswitch 91 positioned near one of the idle rollers, in this case the roller 80, is also provided on the inlet end portion of the above mentioned guide and feeding mechanism 43, which sensor is connected to the machine electric circuit and arranged for controlling the electric motor 90, in a manner to switch it on and off when said microswitch respectively senses the presence or absence of the waffles 40 in the waffle band 41. In the case of the presence of the band, the microswitch is operated by the passage of each waffle 40 from one operative position to the other one thereof, by generating corresponding electric pulses which are recognized and counted by the machine control logic circuits, which as response provide for switching the electric motor 90 on when the first electric pulse generated by the initial portion of the first band waffle is sensed, thereby causing the same band to advance in the mechanism 43, and switching such motor off when the electric pulse generated by the initial portion of the subsequent waffle is sensed, thereby causing the advancing band to stop at such a position as one or two new waffles, each one following the preceding one, are always positioned below the associated infusion units, waiting for the carrying out of the correspondent infusion operation with the criteria which will be described.

Let us now consider in detail the structural composition of the infusion units 35 and 36 which are constituted, in addition to the above mentioned boilers 37, which are placed side-by-side to each other and rigidly secured on the upper side of the guide and feeding mechanism 43, also by a movable unit portion 92 situated at a position below both boilers 37 and reciprocatingly sliding along a set of vertical and parallel rods 93, secured to the lower side of said mechanism 43 and projected downward to a certain extent thereof.

The movable unit portion 92 is provided with two hoppers 94 housed inside cups 95, shaped with a size almost corresponding to the size of the pair of boilers 37 and delimited at its lower side by a flat terminal wall 96. The hoppers 94 are made integral with half-filters 97 at the upper open end portion thereof and are provided on a position and with size which is exactly corresponding to those ones of another half-filter 98, provided on a respective lower through opening 99 of the boilers, said half-filters 97 and 98 being adapted to contain a respective waffle 40 packed in advance when they are moved to a position close to each other as it will be described hereinbelow.

Figure 6:
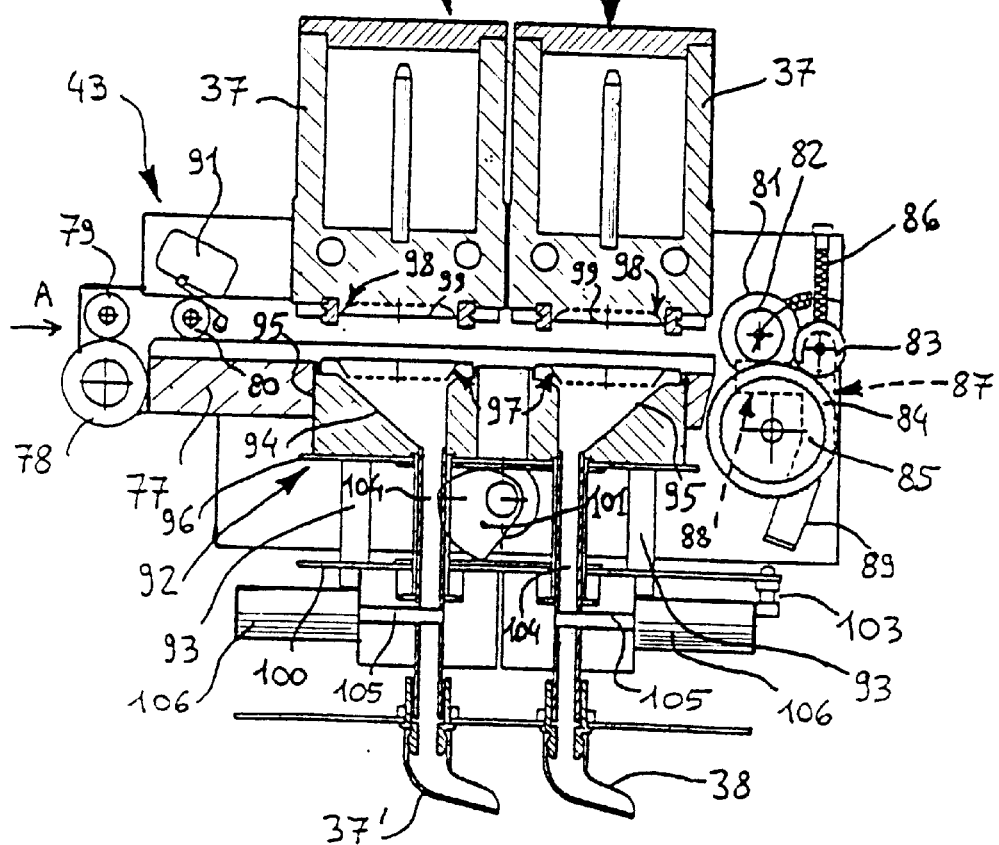
FIG. 6 shows a cutaway front view of a constructive item of the machine according to the inventions displaced in a first operative position thereof.
Figure 8:
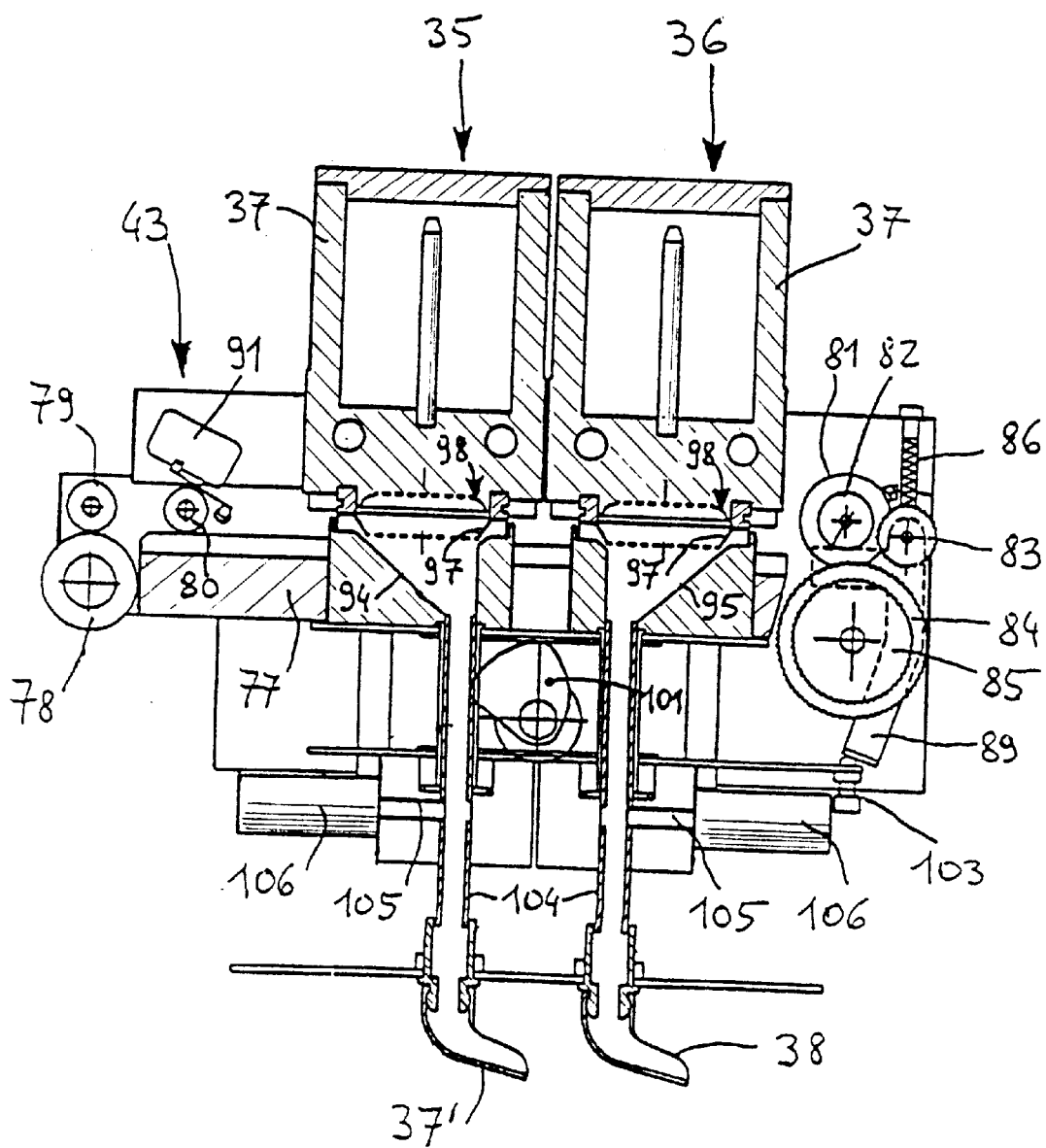
FIG. 8 shows with the same view of FIG. 6 the constructive item displaced in a second operative position thereof.
Figure 11:
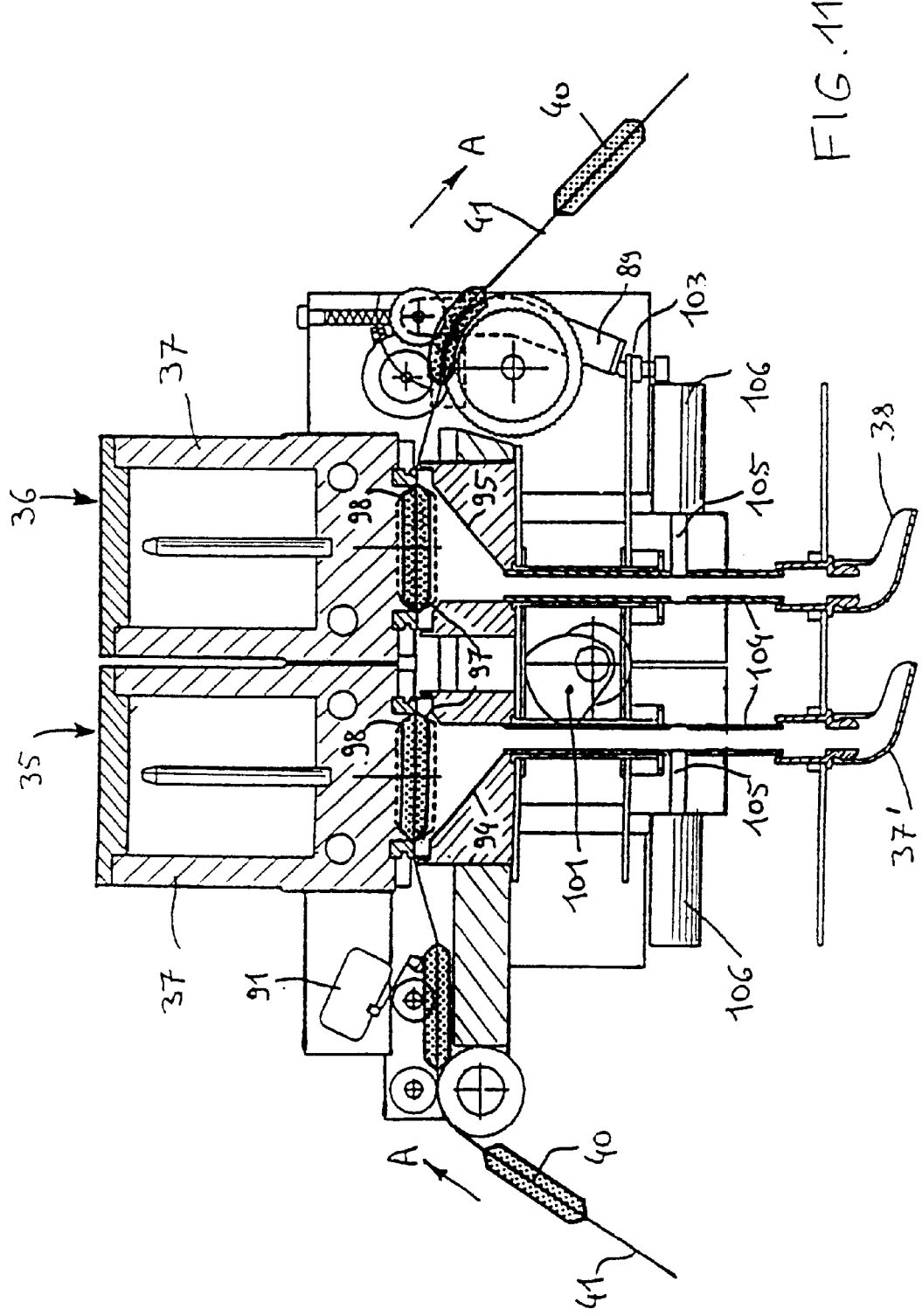
FIG. 11 shows with the same view of FIG. 8 the constructive item displaced in the same operative position and incorporating the waffle band.

The movable unit portion 92 is also provided with a further flat wall 100, at a position below and spaced away as well as parallel with respect to the preceding flat wall 96, and is operated vertically with a reciprocating rectilinear movement by an eccentric or cam 101 or similar element, which receives a rotary motion from an electric motor 102 secured laterally to the mechanism 43 and rotating in the interspace comprised between both the flat walls 96 and 100, in such a way as to act onto either one of such flat walls during the rotation thereof, so as to move the unit portion 92 from the lowered position thereof shown in the FIGS. 6 and 9, in which the half-filters 97 and 98 of each pair are moved away from each other, thereby permitting the waffle band 41 to pass therethrough, with consequent positioning of the waffles into such half-filter pair for performing the relative infusion operation, to a raised position shown in the FIGS. 8 and 11, in which the half-filters 97 and 98 of each pair are close to each other, thereby providing to enclose the associated waffles positioned here and permitting the infusion operation thereof. Moreover, this latter position is attained while dampening any possible impact stresses by bringing a lock 103 secured to the end portion of the flat wall 100 into abutment with the opposite end portion of the shank 89 of the bracket 87, with consequent compression of the spring system 86.

Besides the hoppers 94 are tapered downward, so as to form corresponding extended conduits 104, passing through the flat walls 96 and 100, which extend up to the respective delivery spouts 37' and 38, into which they can slide with a limited stroke, by keeping always into contact therewith on both the lowered and raised positions of the movable unit portion 92, thereby permitting the coffee (or other infused beverage) to pass through each conduit 104 and the corresponding spout.

In turn, each extended conduit 104 is connected to the mixer-emulsifier 52 through a respective further conduit 105, in which a corresponding switching valve member 106 affecting the inflow port of such conduit is housed which member is made as a solenoid valve or similar element, which can be operated on two different operative positions thereof, in the first of which it puts into communication the conduit 104 with the underlying delivery spout only, and not with the conduit 105 so as to interrupt the communication with the mixer-emulsifier, and in the second position, in which it puts into communication the conduit 104 with the conduit 105 only, and therefore with the mixer-emulsifier and not with the delivery spout.

Furthermore each delivery spout communicates directly with the associated boiler through an auxiliary conduit, affected by a solenoid valve or the like and provided with an injector (all these components are not indicated in the Figures) leading near the same spout. The object of such auxiliary system is to permit pre-established metered quantities of hot water to pass through the respective spout, which water therefore is introduced in the underlying glass or receptacle before the coffee (or other infused beverage), so as to determine the additional metering (espresso coffee for one or two persons). Such an additional metering is adjusted by setting it in advance at the needed amount with the push-button 59 on the control panelboard 54, thereby determining a change of the opening times of the solenoid valve associated to such an auxiliary conduit, and therefore of the delivered hot water quantity.

Figure 20:
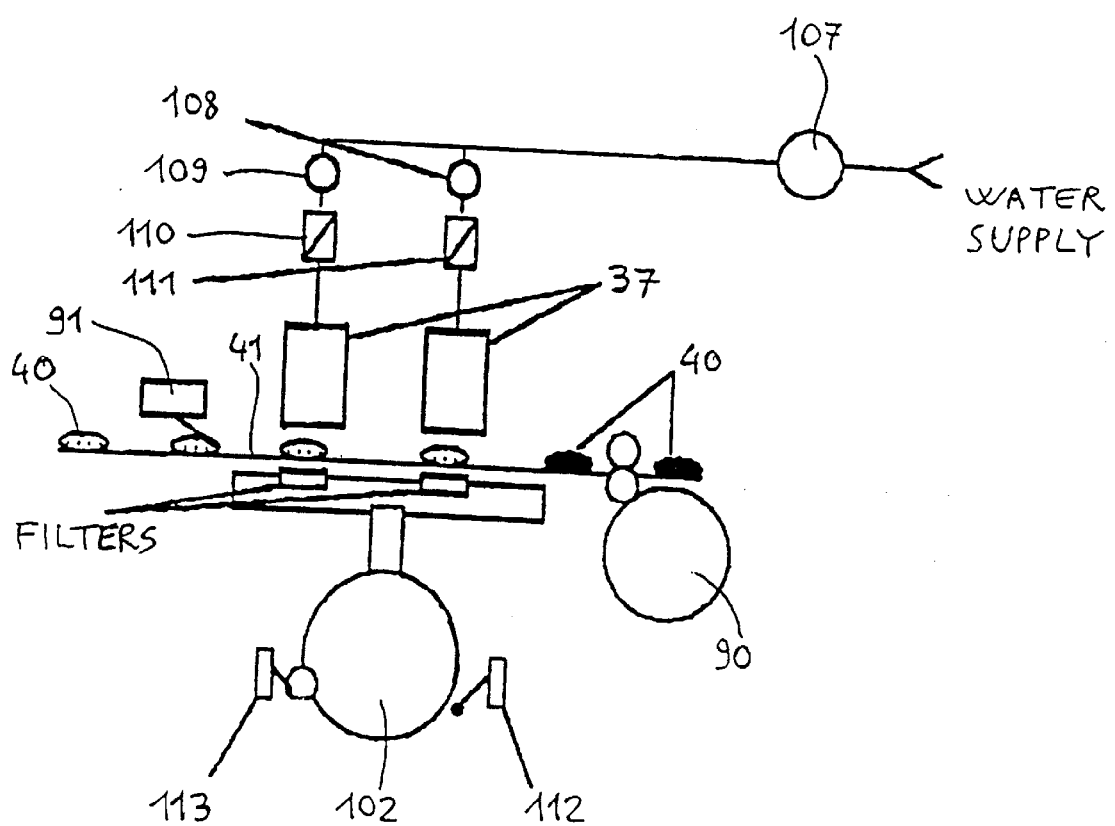
FIG. 20 shows a part of the electric circuit diagram of the present machine.
Figure 21:
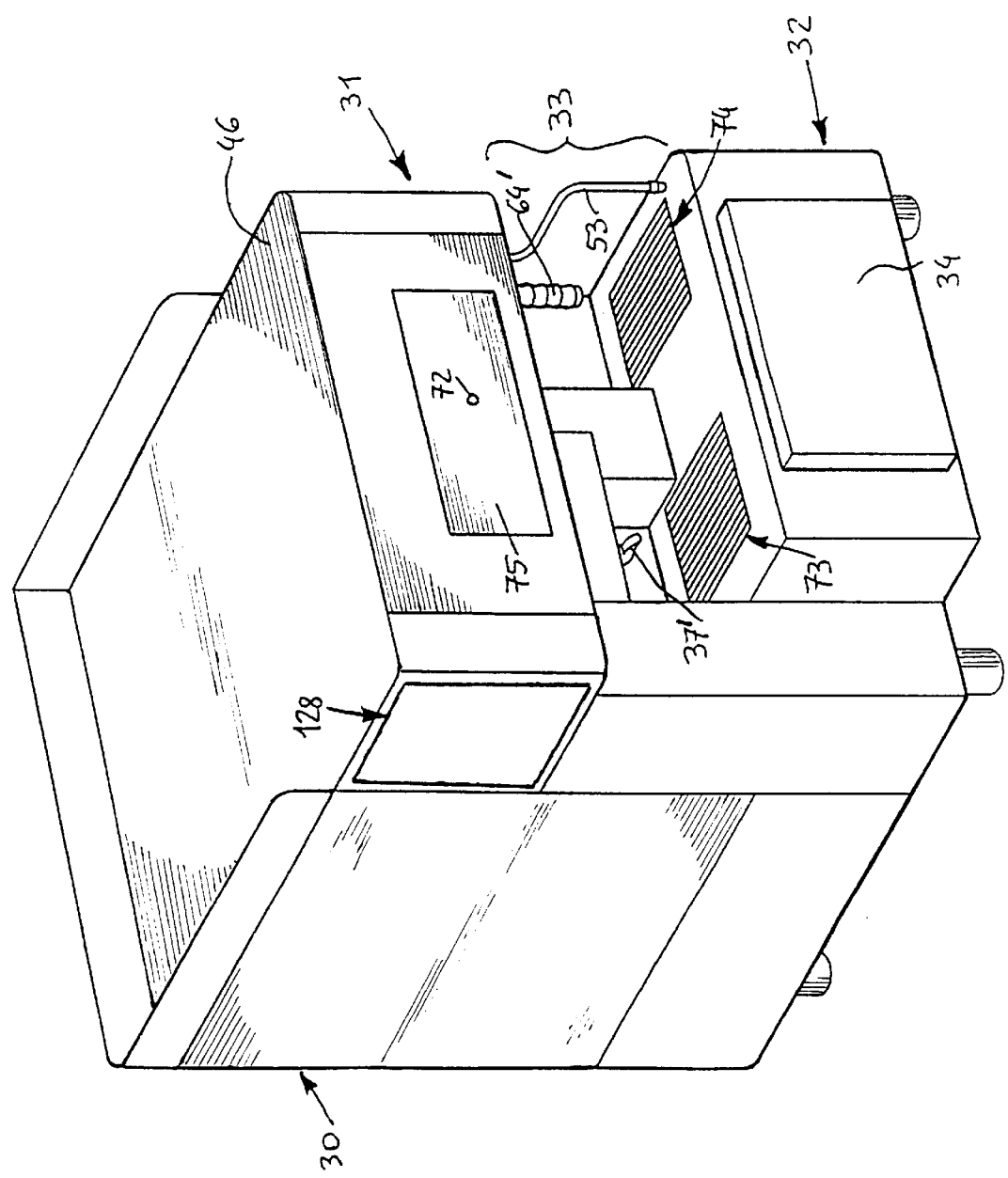
FIG. 21 shows schematically a perspective front view of the machine according to the inventions in a second embodiment thereof.
Figure 22:
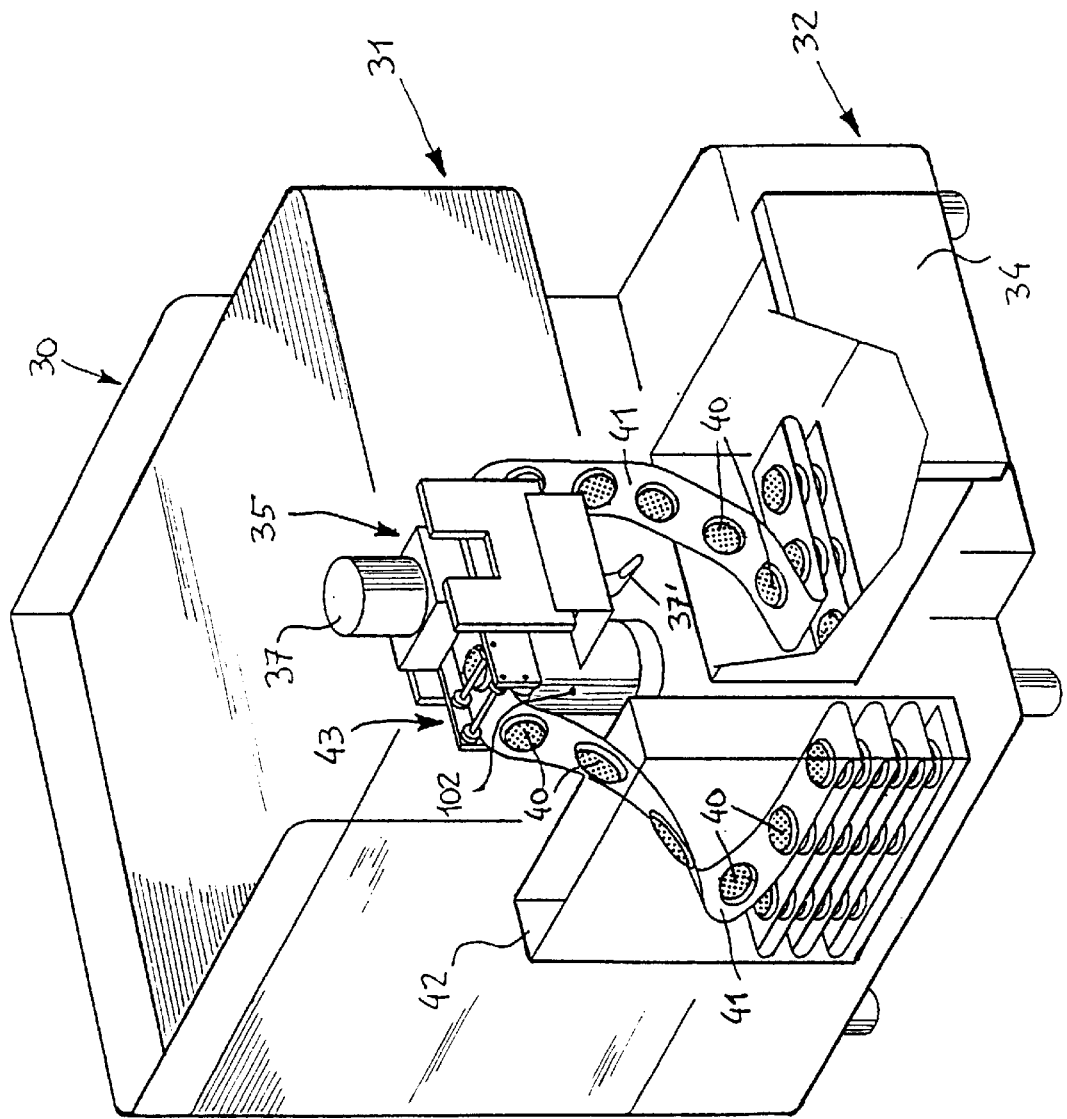
FIG. 22 shows with the same view the machine of FIG. 21, partially cutaway so as to show the inner component parts thereof.
Figure 25:
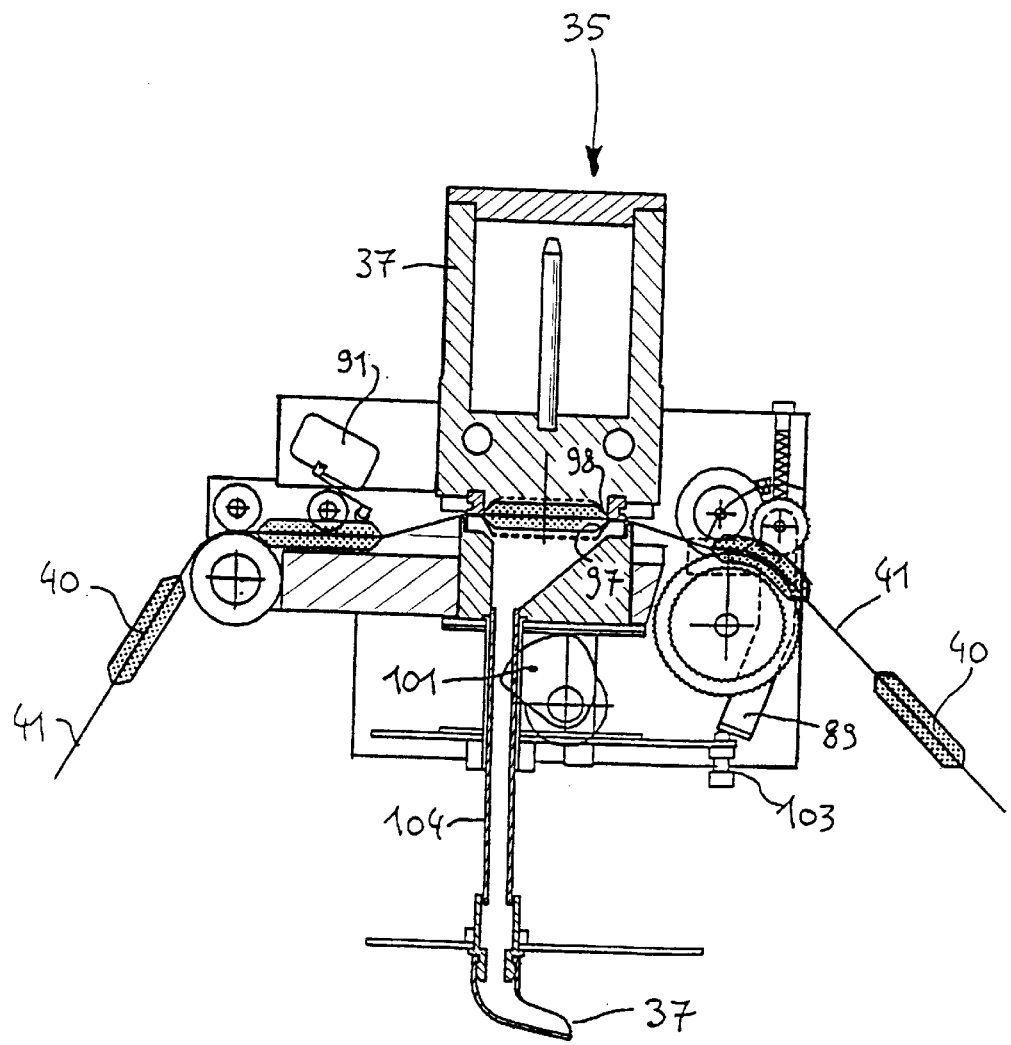
FIG. 25 shows with the same view of FIG. 23 the constructive item displaced in a second operative position thereof.

Turning now to FIG. 20, which shows the electric circuit diagram of the component parts of the infusion units 35 and 36, it is noted that these component parts substantially comprise a circulating pump 107 joined to the water supply or any possible separate water container (not shown) and the associated boilers 37 of said infusion units, through a respective metered volumes 108 and 109 and a respective solenoid valve 110 and 111 or the like connected to the machine electric circuit and controlled by the control logic circuits. In this case, the water quantities are counted by the volumetric meterings 108 and 109, the adjustments of which are set in advance on the machine control panelboard 54, and introduced into the boilers through the solenoid valves 110 and 111, thereby providing for metering the coffee (or other infused beverage) to be delivered.

These component parts also comprise the resistances, not indicated in the Figure, for heating water in the boilers and the steam generating boiler (not shown), with the associated temperature sensors, control and regulation switches, the microswitch 91 for sensing the presence of the waffle band 41 and the microswitches 112 and 113 for sensing the upper and lower end of stroke of the movable unit portion 92, as well as sensors for sensing the level and the minimum safety level into the steam boiler, as well as sensors for sensing and supervising the operation of the different component parts, and the like. In addition, these component parts are regulated through relays controlled by signals generated by the machine control logic circuits, which in turn are assembled on a card.

Turning now to FIGS. 1,2 and 13–19, the mixer-emulsifier 52 is represented schematically for preparing and distributing either the white coffee, or other infused beverages mixed with milk, or the hot milk only, with or without foam. This mixer-emulsifier is substantially constituted by a first and a second box-like structure 114 and 115 having different dimensions, which are communicating with each other, and joined laterally to the conduits 105 communicating with the infusion units 35 and 36 as described hereinabove and provided at the upper side thereof with an air conduit 117, open at its upper side and affected by a related solenoid valve or the like (not shown), the opening or closing of which respectively permits or prevents the air passage through the same conduit, as well as provided at the lower side thereof with one or more short conduits 118 for distributing either the coffee (or other infused beverage), or the white coffee (or other infused beverages mixed with milk), or the milk only.

In FIGS. 13–19, in particular, there are shown some possible embodiments of the mixer-emulsifier 52. In FIG. 13 it is noted that the mixer-emulsifier is provided with a single lower conduit 118 and two upper conduits 119 and 120, which are provided respectively for the passage of steam under pressure and milk and which are connected through a corresponding solenoid valve or the like (not shown) to the steam generating boiler and the milk vessel, said conduits being connected to the other conduit 117 by means of a common manifold conduit 121.

In this way, the distribution of the white coffee (or other infused beverage) is obtained by opening at the same time the solenoid valves for the passage of the milk, steam under pressure and air, thus causing the milk to be heated by the steam under pressure and emulsification with air sucked by venturi effect, with consequent milk foam production, and effecting the mixing of this latter with coffee (or other infused beverage) introduced at the same time into the mixer-emulsifier through either one or both conduits 105 connected to the infusion units referred to. In turn, the distribution of the single heated milk without foam production is obtained by interrupting the passage of coffee (or other infused beverage), and opening the solenoid valves for the passage of milk and steam under pressure, as well as closing the solenoid valve to prevent introduction of air with consequent preparation of hot milk without emulsifying it with air.

Similarly the distribution of hot milk with foam is effected with the same sequence of steps as described, with the additional opening of the solenoid valve for air, which therefore causes the emulsion of such milk with air.

In FIGS. 14 and 15 there are shown two other embodiments of the mixer-emulsifier, which are provided with one (or more) pairs of lower distribution conduits 118, onto at least one of which the conduit 105 of the infusion units leads (on the left side conduit in the FIG. 14, and on the right side conduit in the FIG. 15).

Figure 17:
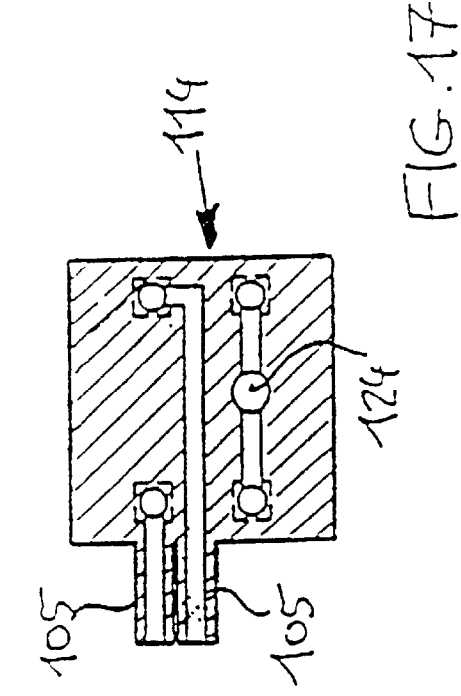
FIGS. 16, 17 and 18 show respectively a schematic front view, a plan view and a perspective front view of a component part of the constructive item of FIG. 13, made in another embodiment thereof.
Figure 16:
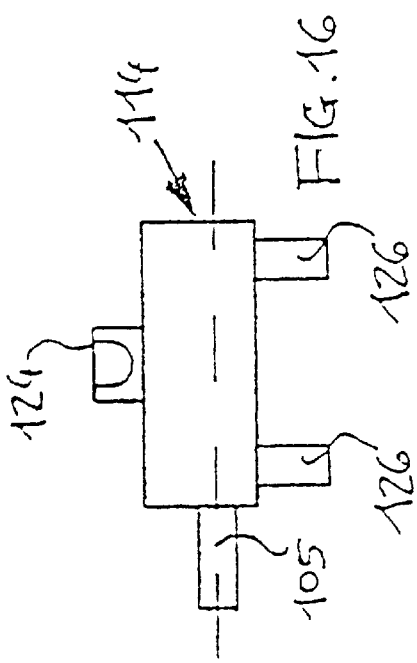
Figure 18:
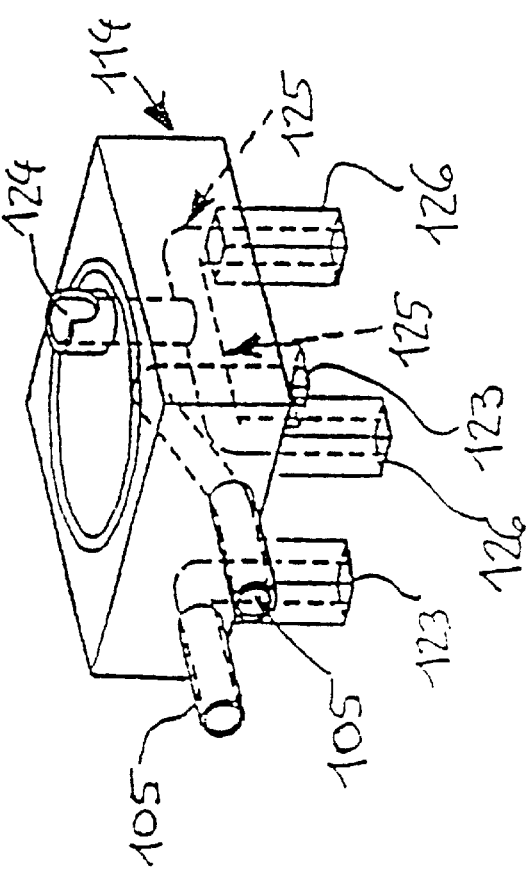

FIGS. 16–18 show another embodiment of the component part of the mixer-emulsifier. This component part is constituted by the box-like structure 114 provided with a pair of conduits 105 joined laterally thereto, for introducing coffee (or other infused beverage) therein, which conduits are bent downward continuing with a respective production, and effecting the mixing of this latter with coffee (or other infused beverage) introduced at the same time into the mixer-emulsifier through either one or both conduits 105 connected to the infusion units referred to. In turn, the distribution of the single heated milk without foam production is obtained by interrupting the passage of coffee (or other infused beverage), and opening the solenoid valves for the passage of milk and steam under pressure, as well as closing the solenoid valve to prevent introduction of air with consequent preparation of hot milk without emulsifying it with air.

Similarly the distribution of hot milk with foam is effected with the same sequence of steps as described, with the additional opening of the solenoid valve for air, which therefore causes the emulsion of such milk with air.

In FIGS. 14 and 15 there are shown two other embodiments of the mixer-emulsifier, which are provided with one (or more) pairs of lower distribution conduits 118, onto at least one of which the conduit 105 of the infusion units leads (on the left side conduit in the FIG. 14, and on the right side conduit in the FIG. 15).

Figure 19:
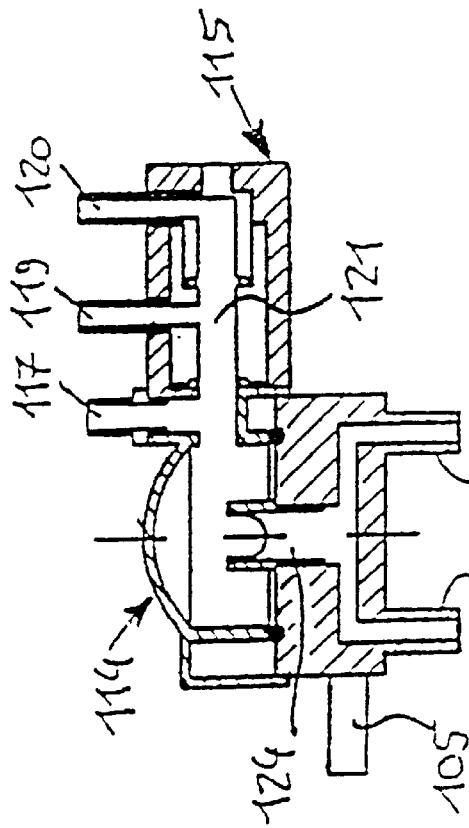
FIG. 19 shows schematically a cutaway front view of the item with the component part of the FIGS. 16–18.

FIGS. 16–18 show another embodiment of the component part of the mixer-emulsifier. This component part is constituted by the box-like structure 114 provided with a pair of conduits 105 joined laterally thereto, for introducing coffee (or other infused beverage) therein, which conduits are bent downward continuing with a respective short portion of vertical conduit 123, as well as provided with a single upper conduit 124 joined at the lower side thereof to a pair of conduits 125 directed downward, which continue with a respective short portion of vertical conduit 126, parallel to and spaced away from the preceding conduit portions 123, wherein such an upper conduit 124 can be coupled to the other box-like structure 115 of the mixer-emulsifier, which is provided with the same upper conduits 117, 119 and 120, and as shown in FIG. 19. In this way, the milk which is introduced through the mixer-emulsifier 52 is distributed through the conduits 125 into the glass, where it mixes itself with the coffee (or other infused beverage) distributed through the conduits 105.

There are now described briefly the operative cycles which can be performed with the machine according to the inventions which as explained permit the distribution either of the coffee only (or other infused beverage) by utilizing the waffles 40 packed in advance, or the white coffee (or other infused beverage mixed with milk) or the milk only, with or without foam.

First of all in order to introduce a waffle band 41 in the machine, the upper portion 31 thereof is provided with at least a lid 128 for the access to a push-button of "SET", which is operated to a switched on position thereof after the extended initial end portion of the same band has been introduced in the inlet end portion of the guide and feeding mechanism 43, until the extended portion positions itself near the powered rollers 81–85, which engage it and therefore determine the band advancement, by stopping it as soon as the sensor 91 senses the initial portion of the first waffle, which in turn is positioned upstream the first infusion unit 35. At this point, the machine is ready for the selection, which is effected by acting on the control panelboards 54, 55 and 56, of both the different desired operative cycles, and the respective dose of coffee (or other infused beverage) to be distributed, until the maximum amount thereof recommended by the manufacturer or distributor, the adjustment of which determines a consequent change of the switching on time of the volumetric meters 108 and 109 associated to the respective infusion units 35 and 36.

Then, in the case in which the coffee distribution for one or two persons, without metered addition of hot water, is selected by pressing either the push-button 57 or 58, this cycle provides first of all the waffle band advancement up to position respectively a single waffle below the infusion unit 35 or two waffles one before the other below the corresponding infusion units 36 and 35. Afterwards, as soon as the waffle or waffles have reached this position, the eccentric or cam 101 of the associated infusion unit is driven in rotation and therefore provides for displacing the correspondent unit portion 92 from its lowered position of FIG. 6 to its raised position of FIG. 8, in a manner that the corresponding half-filters enclose such waffle or waffles. Thereafter, prior to performing the infusion operation in the associated infusion unit, a brief pre-infusion step (of 1" approx.) is performed therein by switching on for this purpose solely the solenoid valve of this unit for such short time, with consequent passage of a reduced quantity of hot water which moistens the thin wall of the underlying waffle positioned there, thereby facilitating the carrying out of the subsequent actual infusion step and improving the quality of the obtained infused beverage. The actual infusion step follows such pre-infusion step, and is performed by keeping the metered volume on for the previously selected period of time, which metered volume is associated with the infusion unit or units, with consequent distribution of the desired dose of coffee (or other infused beverage) respectively for one or two persons. Then, at the end of the infusion step, such eccentric or cam 101 is driven in rotation again, thus displacing the correspondent unit portion 92 from the raised position to the lowered position thereof, so that the corresponding half-filters do no more enclose the already used and exhausted waffle or waffles, and switch the powered rollers 81–85 on for a short time (of approx. 0,5"), which is sufficient to advance the waffle band 41, and move the exhausted waffle or waffles out of the half-filters, thus preventing any undesired sticking of the same waffles between the half-filters. In the case in which the distribution of coffee for one or two persons, with metered addition of hot water, is selected by pressing either the push-button 59 or 60, at a desired pre-established quantity thereof which has been selected in advance with the push-button 63 in a way to change the duration of the water supply as described hereinabove, such a distribution is effected by introducing in the underlying glass first of all this additional metered hot water and thereafter the coffee (or other infused beverage) which is prepared with the same operative steps as described.

In order to permit the end portion of each band to be sensed, when all the waffles are exhausted, the electric pulses which will be generated by the sensor 91 after the passage of all the waffles therethrough, which corresponds to the length of the same band, are stored in advance in the machine logic circuits by acting on the control panelboards of the same machine. In this manner, as long as the waffles of the band are utilized, the sensor provides to generate the relative electric pulses which are counted progressively by the control logic circuits, and, as soon as these latter sense the presence of the last ten pulses, on the condition in which the last ten waffles are present below the infusion units, such condition becomes evident on the display so as to inform the user that the band will be exhausted imminently and needs to be replaced. Then when also the last waffles are exhausted, such logic circuits provides to make evident the exhausted band condition on the display, in order that the user provides for replacing it. In order to perform this operation, the user must first of all actuate the "SET" push-button again, thus switching the powered rollers 81–85 on for a short time (of approx. 5 min.), which is enough to advance the band in such a way that the last exhausted waffles are displaced out of the associated infusion units making free the infusion path and the corresponding half-filters.

At the same time the metered volumes and solenoid valves associated with the infusion units 35 and 36 are switched on, with consequent passage of water for cleaning the half-filters from the residues of coffee or other raw materials employed for the infusion and making them ready for performing the subsequent infusion steps with a new waffle band.

At the end of the cleaning operation, the machine is set for the introduction of this new waffle band and such condition is displayed on the display 62, together with the filling condition of the slidable drawer 34 with the substances discharged after the different infusion steps, which therefore shows the need of emptying these substances from the same drawer.

Afterwards, the new waffle band is introduced in the machine by repeating the same operations as described with consequent carrying out of further operative cycles for the selection of coffee or other infused beverages which are identical to the above cited ones.

The present machine is programmed with its logic circuits for operating also in the case in which any possible operative fault or failure occurs, as for example the waffle band breakage, an incorrect or incomplete compression of waffles, the machine supply lack and the like. Then, in the case of waffle band breakage, this condition is shown on the display 62, so that the user can remove the broken band portion from the machine by reintroducing the band extended initial end portion in the guide and feeding mechanism 43 and by repeating thereafter the same operations of band introduction as previously specified. In the case of an incorrect or incomplete compression of waffle, the unit portion 92 of the respective infusion unit does not reach its upper position or reaches it after a time longer than the pre-established time stored in the machine logic circuits, so that the sensor of the upper end of stroke 112 associated with the same unit portion 92 provides for signalling this operative defect on the display 62, in which condition the user selects the desired operative cycle again with the related push-button, so that the unit portion 92 is lowered and then raised, thus determining the correct waffle compression and the consequent distribution of the selected infused beverage.

In the case of supply lack in the course of an operative cycle, such cycle is considered ended so that the unit portion or portions 92 in the course of the infusion step returns automatically from the raised to the lowered position thereof, and therefore a new selection of the desired cycle is needed and is performed. Then, under these circumstances, when the machine supply is lacking, it is possible to prevent further selections by pressing the stop bush-button 61 for a short period of time (of approx. 10"), by making evident such condition on the display 62, by resetting the cycle selection capability again while pressing such push-button again for an equal period of time.

In the case in which the distribution of white coffee (or other infused beverage mixed with milk) is selected by pressing either the push-button 66 or 67, this cycle provides the distribution of milk and thereafter the distribution of coffee (or other infused beverage) in the underlying glass or receptacle. For this purpose, when the milk is distributed, the machine logic circuits control the switching on of the solenoid valves associated with the respective conduits 117, 119 and 120 for air, steam under pressure and milk, for a switching on time corresponding to the milk dose to be obtained, which is stored in the above logic circuits and set in advance on the control panelboards and this condition is shown on the display 62. Subsequently, such logic circuits provide to control at the same time also the switching on of the infusion units 35 and 36 for preparing the coffee (or other infused beverage) with the same operative steps as already described and the switching valve member 106 housed in the conduit 105 connected between said infusion units and the correspondent mixer-emulsifiers 52, so as to switch such a valve member on its second operative position wherein said infusion units are communicating with the corresponding mixer-emulsifiers, thus causing the coffee (or other infused beverage) to be deviated through the conduit 105 and consequently mixed with the milk in the underlying glass or receptacle.

In the case in which the distribution of the hot milk, without foam, is selected, either the push-button 68 or 69 is pressed and the distribution of hot milk with foam is pressed and the push-button 70 is pressed in which case the machine control logic circuits provide to keep the switching valve member 106 switched on its first operative position, in which said infusion units are not communicating with the respective mixer-emulsifiers, by controlling also the switching on of the solenoid valves associated with the respective conduits 119 and 120 for steam under pressure and milk and also the solenoid valve associated with the air conduit 117 for obtaining milk with foam only. Then, in this latter case, the switching on of the solenoid valve is maintained for a time corresponding to the dose of hot milk with foam to be obtained, which is stored in the above mentioned logic circuits and set in advance on the control panelboards by showing such operative condition on the display 62. The present machine, moreover, also provides for the possibility to adjust, with the same selection criteria on the different control panelboards, the switching on of the solenoid valve associated with the steam conduit, so as to change the heating temperatures for the relative beverages. Finally, in the different machine control panelboards there can be selected also different adjustment values for the component parts and the sensors of various kind, as for example for the water level control and the boiler safety level, the heating resistances etc. . . .

Turning now to the FIGS. 21–25, in which a machine according to the invention in a second embodiment thereof is shown, it is noted that such machine is substantially identical to the one just described and therefore its constructive items are indicated with the same reference numerals of the preceding one. However, this machine differs from the preceding one in that it provides for the distribution of coffee (or other infused beverages) only, and not that of white coffee and milk, so as its relative component parts are eliminated, with consequent machine size reduction. Besides, in this case the machine provides for the distribution of a coffee (normal or weak coffee) at a time and for this purpose it is provided with a single infusion unit 35 cooperating with a guide and feeding mechanism 43, which are made and operating as the similar component parts previously described. Then, in this case the machine is provided with three front push-buttons (not shown) for the selection respectively of a coffee (or other infused beverage) with a normal dose (normal coffee), or with the hot water addition (weak coffee) as well as for stopping the machine operation (stop position) and setting the different operative programs and parameters of the same machine, with the same criteria as previously described.

This machine can be used both autonomously and combined with the previously described machine, in such case by permitting advantageously to prepare decaffeinated coffee by introducing respective bands of waffles containing decaffeinated coffee therein.

I claim:

1. A machine for preparing coffee, white coffee or similar infused beverages, on single or multiple doses thereof, comprising a box-shaped housing (30), an upper portion (31) and a lower portion (32) of said machine contained in said housing, said lower portion (32) having an upper horizontal surface (39), said upper portion having an upper wall (46) and an overturning lid (45) hinged to said wall (46), said upper portion and lower portion being joined, a pair of infusion units (35) and (36), said upper portion (31) having an interior, a left side and a right side, said infusion units (35) and (36) being located in the interior and left side of said upper portion, being side-by-side and each having a boiler (37) for containing and heating water and for preparing steam under pressure, a plurality of waffles (40) containing coffee or the raw materials of said similar infused beverages, said waffles being applied on a band (41), filtering means (97) and (98), a guide and feeding mechanism (43) associated with said infusion units (35) and (36), and with said filtering means, said band (41) advancing towards said infusion units (35) and (36) and said filtering means for preparing coffee or said other infused beverages, delivery spouts (37') and (38) located below said infusion units and said band (41), said coffee or said similar infused beverages going through said delivery spouts, receptacles placed on said surface (39), said coffee or said similar infused beverages being collected in said receptacles, a box-shaped tank (44) for containing milk located in said upper portion (31) and being accessible through said lid (45), mixing and emulsifying means (52) for mixing coffee or other similar infused beverages with milk, a refrigerating system for cooling said box-shaped tank (44), switching means (106) communicating with said infusion units (35) and (36), said filtering means (97) and (98) and said mixing and emulsifying means (52), said switching means (106) being operable from a first to a second operative position thereof, in which they prevent or permit the communication of said infusion units (35) and (36) and said filtering means (97) and (98) with said mixing-emulsifying means (52), so as to determine the distribution of coffee or other infused beverages respectively not mixed and mixed with milk; means (108) and (109) for regulating the metering of the coffee or other infused beverages and the milk; selection and control means (54), (55) and (56) being associated with said guide and feeding mechanism (43), said infusion units (35) and (36), said filtering means (97) and (98), said switching means (106) and regulating means (108) and (109), for the selection and metering of the different infused beverages to be prepared and distributed and for preparing and distributing the respectively selected and metered infused beverages.

2. The machine according to claim 1 wherein said guide and feeding mechanism (43) comprises two flat rectilinear guide members (76) and (77), parallel and spaced away from each other, fixed in the machine at a position below said infusion units (35) and (36), said feeding mechanism (43) being located at said left side of said upper portion (31), and the mechanism comprises a set of idle rollers (78), (79), (80) and a sensor (91) and at the outlet end thereof a set of powered rollers (81), (82), (83), (84), (85), an electric motor (90), said motor being fixed laterally to said guide members (76), (77), said powered rollers being driven in rotation by said electric motor (90), said sensor sensing the presence or absence of said band (41), said guide members (76), (77) have an inlet end at the left side of said upper portion and an outlet end at the right side, said guide members (76), (77) support at said inlet end, said idle rollers, an interspace (33) is provided between said upper portion (31) and said lower portion (32) a slidable drawer (34) is housed in said interspace, said guide members (76), (77) advancing in a single direction (A) said band (41), from a corresponding collecting magazine (42), placed side-by-side to said infusion units (35), (36) by passing in succession through said first inlet end portion, said infusion units (35), (36) and said filtering means (97), (98), to said second outlet end portion of said guide members (76), (77), and reaching at least said underlying containing drawer (34), a spring system (86) and a bracket (87), said powered rollers (81), (82), (83), (84), (85) being associated to said spring system (86) and said bracket (87), said bracket being provided with a first and a second shank (88), (89), said shank (89) projecting vertically downward beyond said powered rollers, said powered rollers (81), (82), (83), (84), (85) being adapted to cause said band (41) to advance or to be stopped at a position below at least one of said infusion units (35) (36) and said filtering means (97), (98), on the respective conditions in which said sensor (91) senses the initial portion of a waffle (40) and that one of the waffle directly following thereto.

3. The machine according to claim 2 which comprises display means and selection and control means wherein said sensing sensor (91) also provides for counting all the waffles of each band (41), by signalling the end band condition through said display means (62) associated to said selection and control means (54), (55), (56) for the subsequent replacement of said band (41) with a new band.

4. The machine according to claim 3 which comprises a movable unit portion (92), a set of vertical and parallel rods (93) which are secured to the lower side of said guide and feeding means (43), an eccentric cam (101) and an electric motor (102), each one of said infusion units (35), (36) is constituted by at least said movable unit portion (92) situated below said boilers (37) and delimiting with the corresponding boiler said filtering means (96), (97), said movable unit portion (92) being slidable reciprocatingly along said set of vertical and parallel rods (93), said movable unit portion (92) being driven in a vertical direction by said eccentric or cam (101), said cam (101) receives the rotary motion from at least said electric motor (102), said electric motor being secured laterally to said guide and feeding means (43), from a lowered position to a raised position thereof and vice versa and said movable unit portion (92) is respectively moved away and approached with respect to the corresponding boiler (37), thereby permitting said waffles (40) of said band (41) to be positioned freely and enclosed between said filtering means (97), (98) for performing the infusion operation.

5. The machine according to claim 4 which comprises regulating means consisting of metered volumes (108), (109) and solenoid values (110), (111) and each boiler (37) is supplied with water through said regulating means and solenoid values (110), (111).

6. The machine according to claim 4 which comprises a lock (103) and at least a hopper (94) which has an upper opened end portion, wherein said movable unit portion (92) is provided with at least said lock (103) cooperating with said shank (89) to dampen the impact stresses, said hopper (94) is associated to each infusion units (35), (36) and supports at said upper opened end portion a first half-filter (97), cooperating with a second half-filter (98), secured at the lower side to the corresponding boiler (37) and forming with the preceding half-filter said filtering means, said hopper (94) being tapered downward so as to form at least an extended conduit (104) for the passage of coffee or other infused beverage, said conduit (104) being housed slidably into said correspondent spouts (37', 38) for distribution of coffee or other infused beverages, by keeping into contact therewith on both the lowered and raised positions of said movable unit portion (92).

7. The machine according to claim 6 which comprises an auxiliary conduit and each delivery spout (37', 38) communicates directly with the associated boiler (37) through said auxiliary conduit, affected by said regulating means and provided with an injector leading near the same spout for preparing pre-established metered quantities of hot water to be added to the coffee or other infused beverage, prior to the preparation thereof.

8. The machine according to claim 6 which comprises a conduit (105) and a valve member (106) and wherein said switching means comprise at least said valve member (106) made as a solenoid valve and housed in said conduit (105) communicating with said extended conduit (104) and said mixing-emulsifying means (52).

9. The machine according to claim 8 wherein said mixing-emulsifying means (52) comprise a first and a second box-shaped structure (114), (115), communicating and combined to each other, joined to said conduit (105), at least a distribution conduit (118) and respective conduits (117), (119), (120) for the passage of air, steam under pressure and milk, through said regulating means with selective or contemporaneous control, depending on the fact that beverages mixed with milk, or milk only, respectively without or with foam, must be distributed.

10. A machine for preparing coffee, or similar infused beverages, on single or multiple doses thereof, comprising a box-shaped housing (30), said machine having an upper portion (31) and a lower portion (32) contained in said housing, said upper portion having an upper wall (46), a left side, a right side and an interior, said upper and lower portion being joined and an interspace (33) being provided between said upper and lower portion, a slidable drawer (34) housed in said interspace, one infusion unit (35) located in the interior and left side of said upper portion, said infusion unit having a boiler (37) for containing and heating water and for preparing steam under pressure, a plurality of waffles (40) containing coffee or the raw materials of said similar infused beverages, said waffles being applied on a band (41), filtering means (97) and (98), a guide and feeding mechanism (43) associated with said infusion unit (35) and with said filtering means, said band (41) advancing towards said infusion unit (35) and said filtering means for preparing coffee or said other infusion beverages, a delivery spout (37') located below said infusion units and said band (41), said coffee or said similar infused beverages going through said delivery spout and wherein said guide and feeding mechanism (43) comprises two flat rectilinear guide members (76), (77), parallel and spaced away from each other, fixed in the machine at a position below said infusion unit (35), said feeding mechanism (43) being located at said left side of said upper portion (31), and the mechanism comprises a sensor (91), said sensor sensing the presence or absence of said band (41), said guide members (76), (77) have an inlet end at the left side of said upper portion and an outlet end at the right side, said guide members (76), (77) advancing in a single direction (A) said band (41), from a corresponding collecting magazine (42) placed side-by-side to said infusion unit (35), by passing in succession through said first inlet end portion, said infusion unit (35) and said filtering means (97), (98) to said second outlet end portion of said guide members (76), (77) and reaching at least said underlying containing drawer (34) and the machine comprises a movable unit portion (92), an eccentric cam (101) and an electric motor (102), said movable unit portion (92) being driven in a vertical direction by said eccentric or cam (101), said cam (101) receiving the rotary motion from at least said electric motor (102), said electric motor being secured laterally said guide and feeding means (43), from a lowered position to a raised position thereof, and vice versa, and said movable unit portion (92) is respectively moved away and approached with respect to the corresponding boiler (37), thereby permitting said waffles (40) of said band (41) to be positioned freely and enclosed between said filtering means (97), (98) for performing the infusion operation, two selection and control means (54) and (55) being associated with said guide and feeding mechanism (43), said infusion unit and said filtering means (97), (98) for the selection and metering of the different infused beverages to be prepared and distributed and for preparing and distributing the respectively selected and metered infused beverages.

* * * * *